(12) United States Patent
Chan et al.

(10) Patent No.: US 11,052,454 B2
(45) Date of Patent: Jul. 6, 2021

(54) DYNAMIC COLLAR SWAGE CONFORMANCE CHECKING BASED ON SWAGE TOOL PARAMETERS

(71) Applicant: The Boeing Company, Chicago, IL (US)

(72) Inventors: Kwok Tung Chan, Seattle, WA (US); Farahnaz Sisco, Mukilteo, WA (US); Skye Jenkins, Snohomish, WA (US); Jeffrey Devlin, Seattle, WA (US); Nathan Christopher McRae, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/519,714

(22) Filed: Jul. 23, 2019

(65) Prior Publication Data

US 2021/0023607 A1 Jan. 28, 2021

(51) Int. Cl.
*B21J 15/28* (2006.01)
*B21J 15/02* (2006.01)
*F16B 19/05* (2006.01)
*B21J 15/14* (2006.01)

(52) U.S. Cl.
CPC .......... *B21J 15/28* (2013.01); *B21J 15/022* (2013.01); *F16B 19/05* (2013.01)

(58) Field of Classification Search
CPC .......... F16B 19/05; B21J 15/28; B21J 15/022; B21J 15/142; B21J 15/285
See application file for complete search history.

(56) References Cited

U.S. PATENT DOCUMENTS

| | | | | |
|---|---|---|---|---|
| 1,901,431 A | * | 3/1933 | Bond | E21B 47/07 374/203 |
| 3,036,576 A | * | 5/1962 | Wassell | B42F 19/00 40/380 |
| 3,089,062 A | * | 5/1963 | Schulz | H05K 7/12 361/774 |

(Continued)

FOREIGN PATENT DOCUMENTS

| | | |
|---|---|---|
| CN | 101053889 A | 10/2007 |
| CN | 108296406 A | 7/2018 |

(Continued)

OTHER PUBLICATIONS

European Search Report; Application No. EP20183457; dated Dec. 21, 2020.

(Continued)

*Primary Examiner* — Bayan Salone
(74) *Attorney, Agent, or Firm* — Duft & Bornsen, PC

(57) ABSTRACT

Systems and methods are provided for inspecting fastener installation. One embodiment is a method for inspecting installation of a fastener. The method includes determining an initial distance between a nose of a swage tool and an Inner Mold Line (IML) of a part, operating the swage tool to swage a collar onto a fastener that protrudes through the IML of the part, determining a terminal distance of the nose to the IML during swaging, prior to a pintail of the fastener breaking, and arriving at a conclusion indicating a state of a fastener installation, based on the terminal distance.

20 Claims, 15 Drawing Sheets

(56) References Cited

U.S. PATENT DOCUMENTS

| | | | |
|---|---|---|---|
| 3,603,126 A * | 9/1971 | Newman | B21J 15/18 |
| | | | 72/28.1 |
| 3,661,887 A * | 5/1972 | Leebrick | C08G 18/246 |
| | | | 528/18 |
| 4,901,431 A | 2/1990 | Gast | |
| 5,036,576 A | 8/1991 | Gast | |
| 5,315,755 A | 5/1994 | Fulbright et al. | |
| 5,502,884 A | 4/1996 | Ladouceur | |
| 5,661,887 A | 9/1997 | Byrne et al. | |
| 6,089,062 A | 7/2000 | Zemp | |
| 6,256,854 B1 | 7/2001 | Chitty et al. | |
| 6,347,449 B1 | 2/2002 | Calkins et al. | |
| 7,055,393 B2 * | 6/2006 | Smith | B21J 15/043 |
| | | | 73/774 |
| 7,137,182 B2 | 11/2006 | Nelson | |
| 7,503,196 B2 * | 3/2009 | Chitty | B21J 15/043 |
| | | | 227/2 |
| 7,527,759 B2 | 5/2009 | Lee et al. | |
| 7,655,168 B2 | 2/2010 | Jones et al. | |
| 7,802,352 B2 | 9/2010 | Chitty et al. | |
| 7,879,177 B2 | 2/2011 | McCowin et al. | |
| 7,922,856 B2 | 4/2011 | Hagman et al. | |
| 8,012,291 B2 | 9/2011 | Kisch et al. | |
| 8,206,540 B2 | 6/2012 | Evans | |
| 8,336,596 B2 | 12/2012 | Nelson et al. | |
| 8,465,613 B2 | 6/2013 | Rotter et al. | |
| 8,640,757 B2 | 2/2014 | McCowin et al. | |
| 8,758,538 B2 | 6/2014 | Borgmann et al. | |
| 8,808,490 B2 | 8/2014 | Hagman et al. | |
| 9,399,338 B1 | 7/2016 | Metschan | |
| 10,483,901 B2 | 11/2019 | Woyciesjes et al. | |
| 10,821,496 B2 * | 11/2020 | Chan | B21J 15/142 |
| 2004/0060363 A1 * | 4/2004 | Smith | B21J 15/285 |
| | | | 73/849 |
| 2004/0063362 A1 | 4/2004 | Weeks et al. | |
| 2006/0230571 A1 | 10/2006 | Son | |
| 2008/0168816 A1 * | 7/2008 | Chitty | B21J 15/10 |
| | | | 72/21.1 |
| 2018/0148196 A1 | 5/2018 | Chan et al. | |
| 2019/0283113 A1 * | 9/2019 | Chan | B21J 15/022 |
| 2019/0283114 A1 * | 9/2019 | Chan | B21J 15/28 |

FOREIGN PATENT DOCUMENTS

| | | | | |
|---|---|---|---|---|
| DE | 102004020409 A1 | 11/2005 | | |
| DE | 102013112363 A1 | 5/2015 | | |
| EP | 0995518 B1 | 4/2000 | | |
| EP | 1302258 A1 | 4/2003 | | |
| EP | 1712311 A1 | 10/2006 | | |
| EP | 3330173 A1 | 6/2018 | | |
| EP | 3560624 A1 * | 10/2019 | | B21J 15/142 |
| EP | 3560624 A1 | 10/2019 | | |
| WO | 2015083756 A1 | 6/2015 | | |

OTHER PUBLICATIONS

U.S. Appl. No. 15/923,297.
U.S. Appl. No. 15/923,378.
U.S. Appl. No. 15/963,148.
European Search Report; Application EP19190789; dated Feb. 19, 2020.

* cited by examiner

FIG. 3
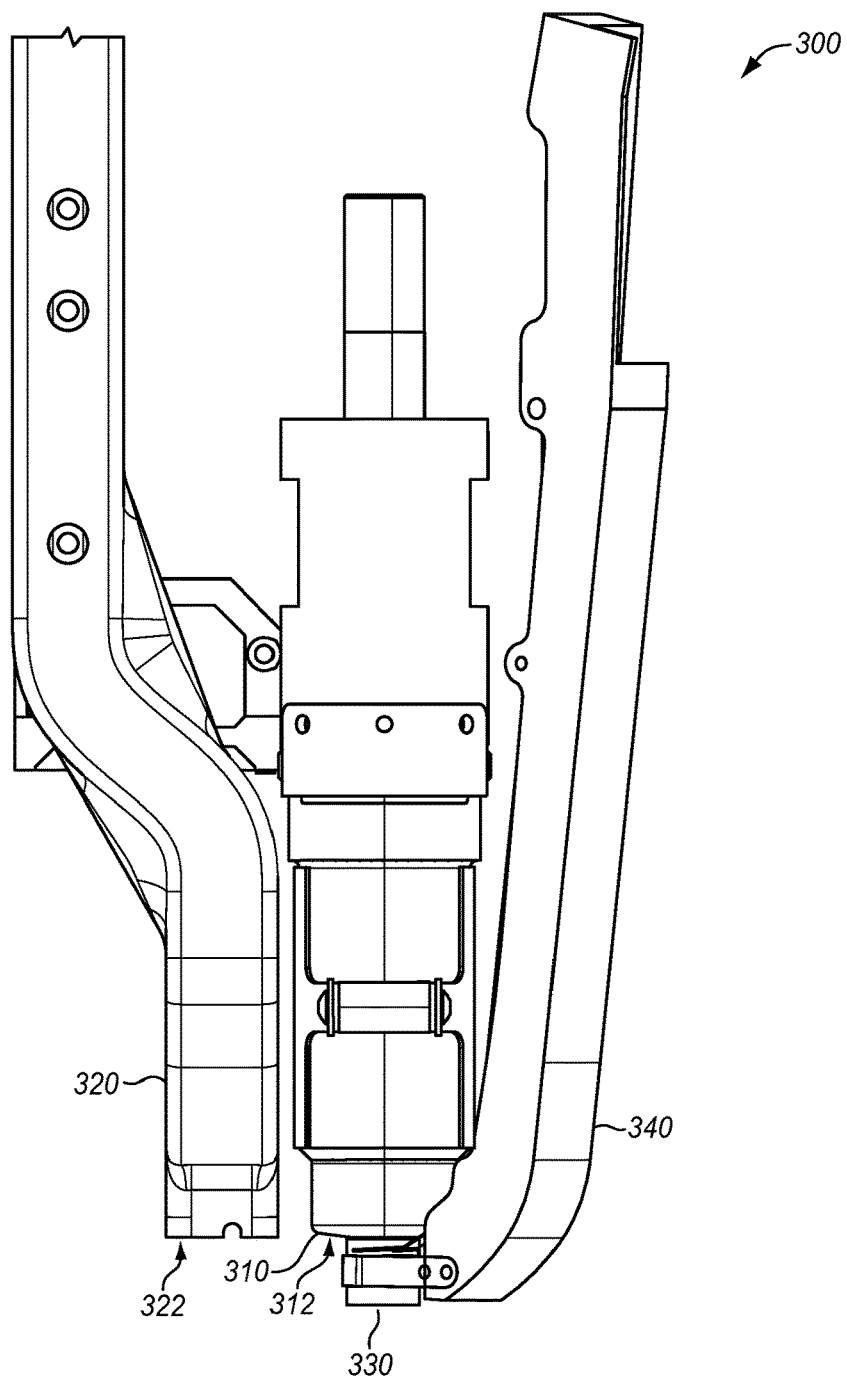
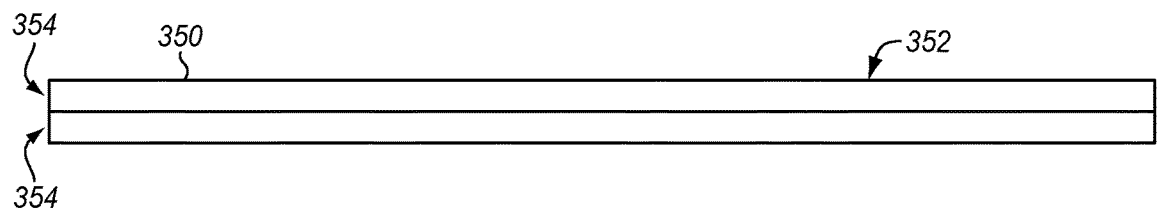

FIG. 4
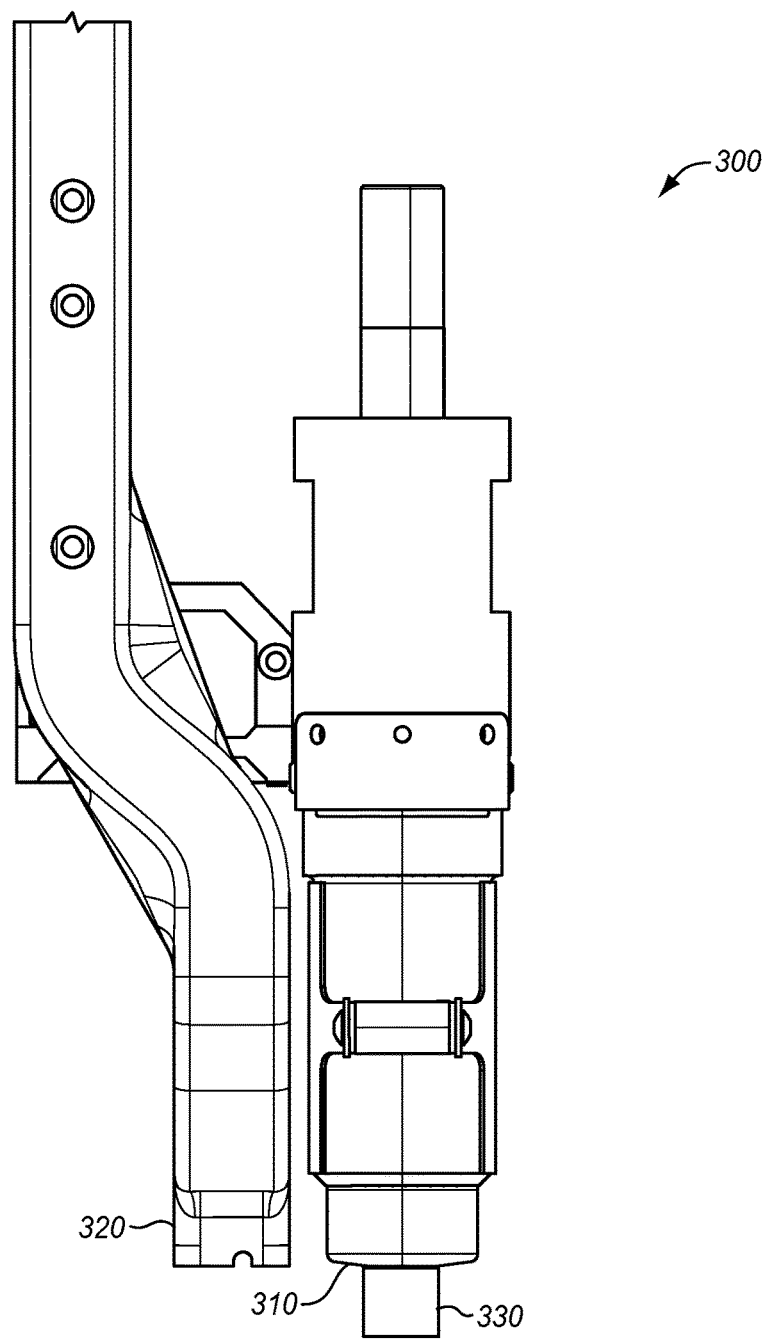
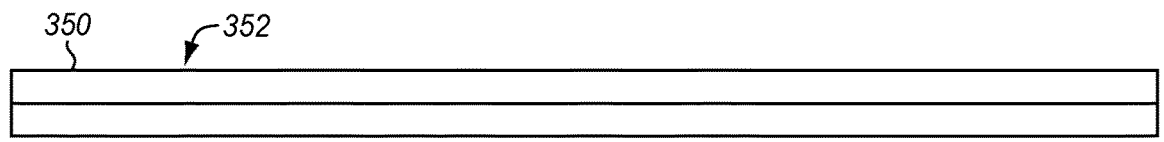

FIG. 7
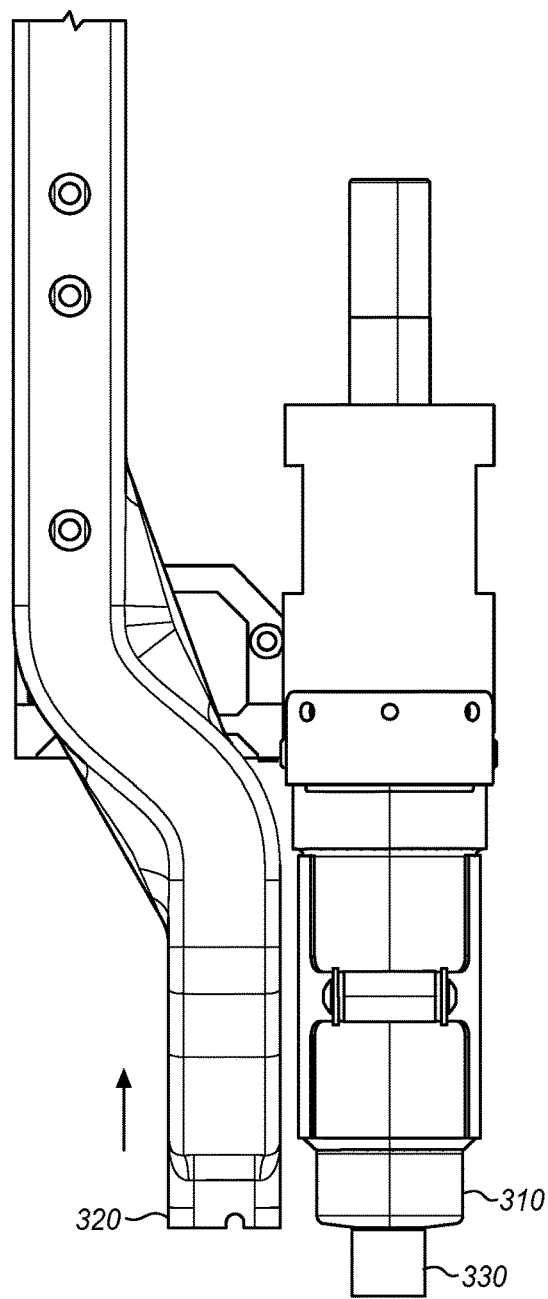
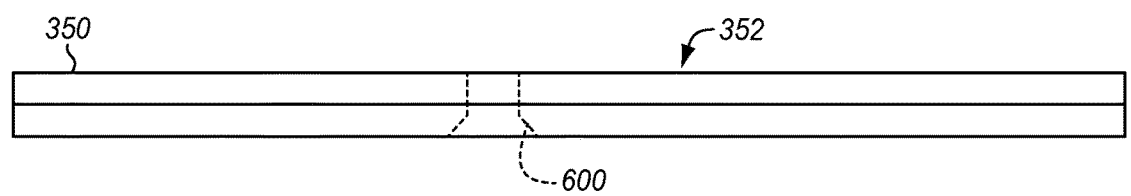

FIG. 8
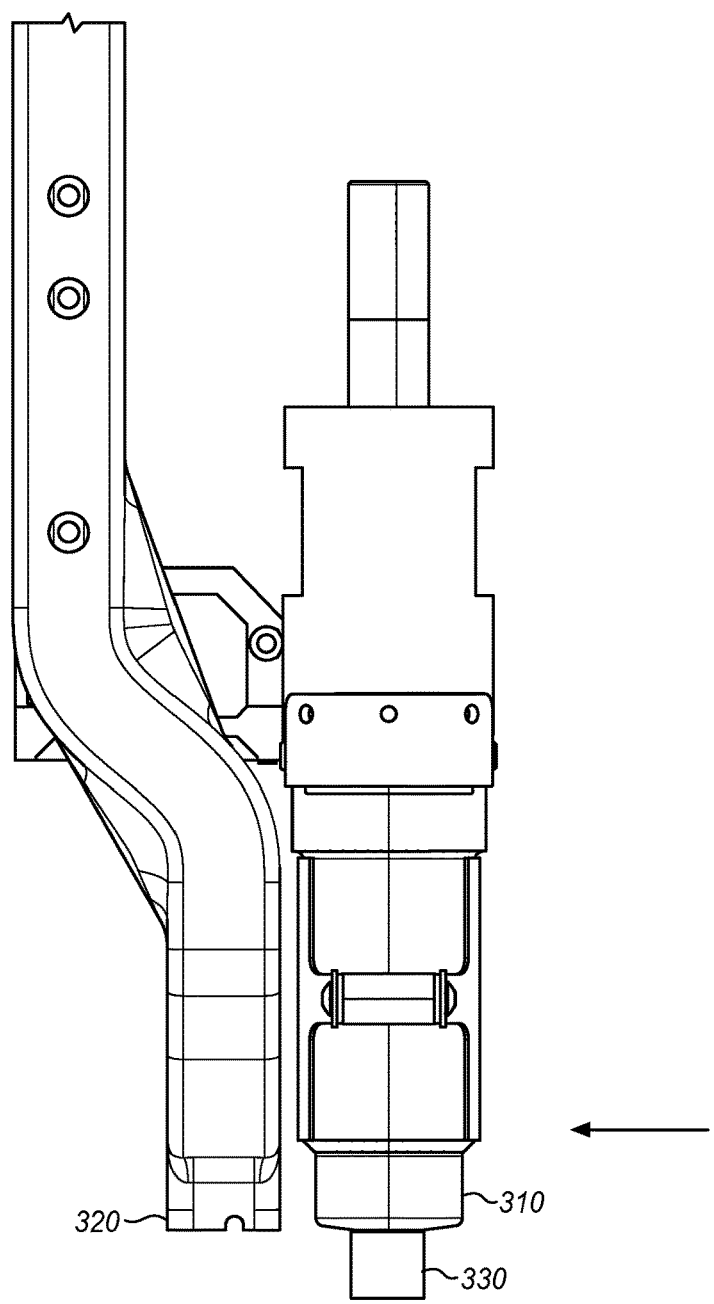
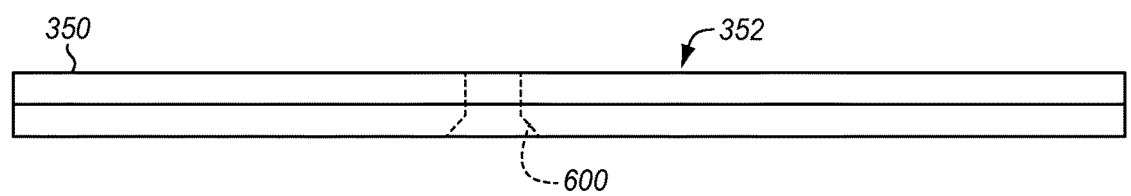

FIG. 12
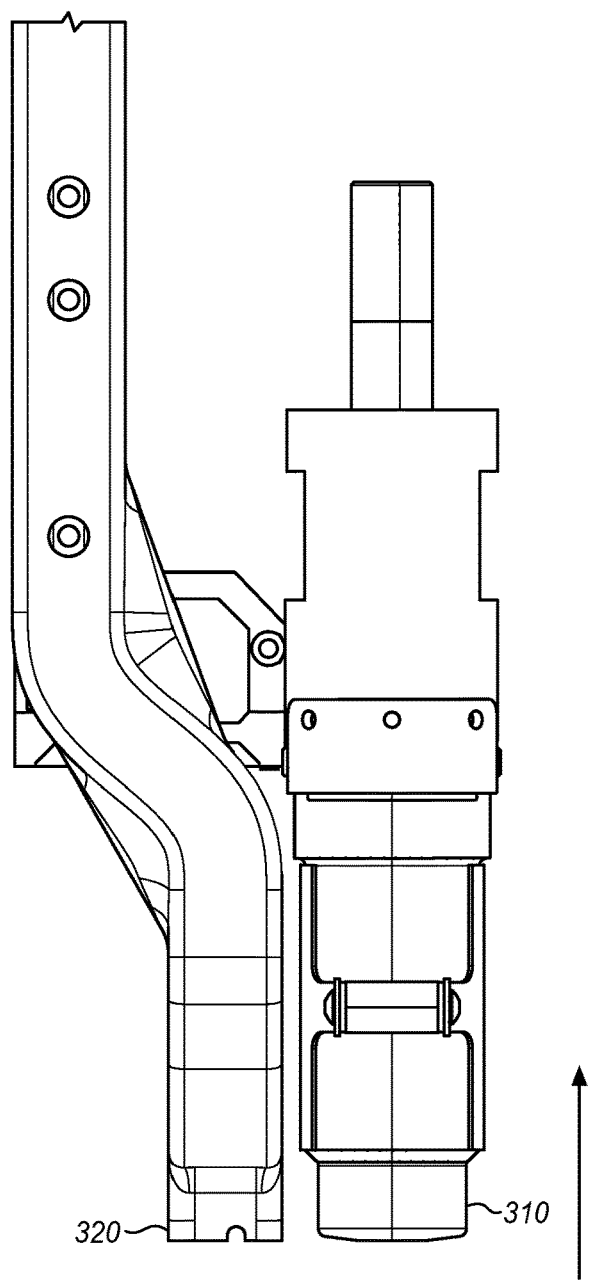
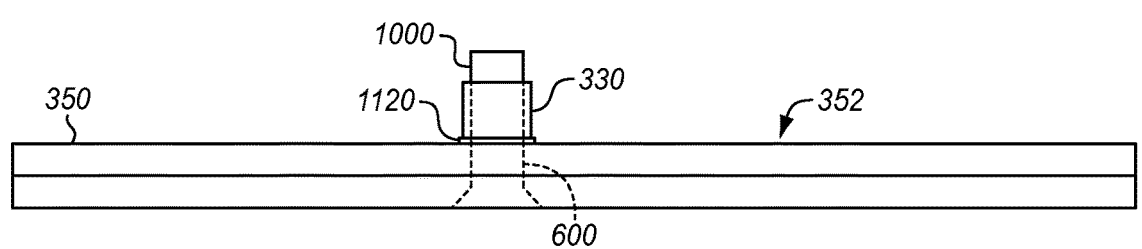

DYNAMIC COLLAR SWAGE CONFORMANCE CHECKING BASED ON SWAGE TOOL PARAMETERS

FIELD

The disclosure relates to the field of assembly, and in particular, to application of fasteners in the form of lockbolts having collars for swaging.

BACKGROUND

The number of fasteners (e.g., bolts) used to assemble aircraft can be astronomical. For example, a midsize commercial jetliner can have several million fasteners that are installed to join different parts together.

Furthermore, a technician must inspect the fasteners installed by an automated tool in order to ensure that work was performed properly. Inspection of the aforesaid millions of fasteners is a labor-intensive process involving manual inspection of fasteners, for example involving manual inspection of each fastener on an aircraft.

Therefore, it would be desirable to have a method and apparatus that take into account at least some of the issues discussed above, as well as other possible issues. For example, it would be desirable to have a method and apparatus that overcome a technical problem with automating the installation of fasteners.

SUMMARY

Embodiments described herein provide systems and methods which are capable of determining whether or not installation of a fastener has been completed successfully, based on locational information indicating a position of a nose of the automated installation tool. The systems and methods described herein may further consider pressure measurements for a hydraulic system that drives an automated installation tool. This provides a technical benefit because it allows the installation tool to report that a fastener should be reinstalled, if readings indicate that installation has not been completed in a desired manner. Hence, the automated installation tools described herein may forego the need for manual fastener inspection required by prior systems.

One embodiment is a method for inspecting installation of a fastener. The method includes determining an initial distance between a nose of a swage tool and an Inner Mold Line (IML) of a part, operating the swage tool to swage a collar onto a fastener that protrudes through the IML of the part, determining a terminal distance of the nose to the IML during swaging, prior to a pintail of the fastener breaking, and arriving at a conclusion indicating a state of a fastener installation, based on the terminal distance.

A further embodiment is a non-transitory computer readable medium embodying programmed instructions which, when executed by a processor, are operable for performing a method for inspecting installation of a fastener. The method includes determining an initial distance between a nose of a swage tool and an Inner Mold Line (IML) of a part, operating the swage tool to swage a collar onto a fastener that protrudes through the IML of the part, determining a terminal distance of the nose to the IML during swaging, prior to a pintail of the fastener breaking, and arriving at a conclusion indicating a state of a fastener installation, based on the terminal distance.

A further embodiment is an apparatus for inspecting installation of a fastener, the apparatus including a swage tool. The swage tool includes a nose that swages collars onto fasteners, a hydraulic cylinder that drives the nose, fingers that hold collars in place at the fasteners prior to swaging, and a sensor that measures a terminal distance between the nose and an Inner Mold Line (IML) of a part that receives the fastener.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 3-12 illustrate an inner mold line machine of a fastener installation system that tracks nose position to evaluate fastener installation in accordance with an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
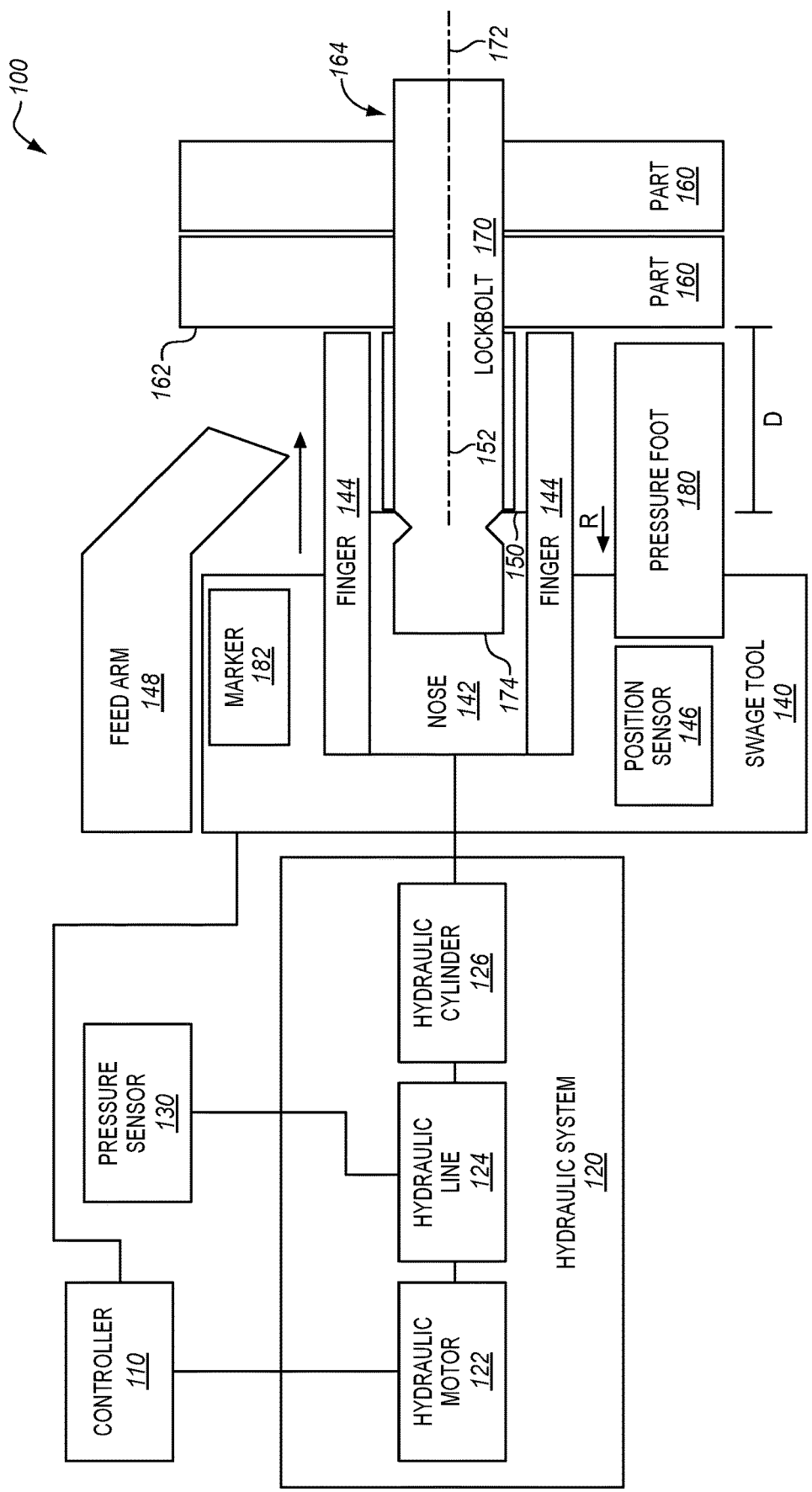
FIG. 1 is a block diagram of a fastener installation system in accordance with an illustrative embodiment.

FIG. 1 is a block diagram of a fastener installation system 100 in an illustrative embodiment. Fastener installation system 100 may comprise a platform that carries an offset collar installer for lockbolts, or may comprise any other suitable components and devices for performing swaging in order to install a fastener (e.g., a lockbolt) in place. Fastener installation system 100 has been enhanced in order to track a position of a nose 142 of a swage tool 140. By tracking the position of the nose 142 during swaging operations, each fastener installation may be reviewed in a manner that ensures the fastener was installed in a desired manner.

In this embodiment, fastener installation system 100 includes controller 110, which directs the operations of a hydraulic motor 122, as well as other electronically manageable components of fastener installation system 100. Controller 110 may be implemented, for example, as custom circuitry, as a hardware processor executing programmed instructions, or some combination thereof.

Controller 110 also controls placement of pressure foot 180. Pressure foot 180 is utilized to clean and/or inspect one or more holes 164 drilled into parts 160, prior to insertion of lockbolts into those holes 164. Pressure foot 180 also applies a vacuum to facilitate clamp-up for one-up assembly. Pressure foot 180 may comprise a hollow channel that is placed over a drilled-out portion of part 160, and may apply a vacuum that draws loose material from the drilled-out portion before a lockbolt 170 is inserted into place. When pressure foot 180 contacts the surface 162 of part 160, a load sensor or other contact sensor coupled with pressure foot 180 is triggered. Based on a known distance between the pressure foot 180 and the nose 142 of swage tool 140, a distance from the nose 142 to the surface 162 may be determined. After a hole 164 has been inspected and/or cleaned by pressure foot 180, a lockbolt 170 is driven through the hole. A collar 150 is provided to fingers 144 via feed arm 148. The collar 150 is placed over the lockbolt 170 by fingers 144, and awaits swaging onto lockbolt 170 via action of swage tool 140.

To perform swaging, controller 110 directs hydraulic motor 122 to actuate the swage tool 140. Pressure generated by hydraulic motor 122 is applied via hydraulic line 124 to hydraulic cylinder 126, and this pressure in hydraulic line 124 is monitored by a pressure sensor 130. Changes in pressure move the hydraulic cylinder 126, which in turn drives swage tool 140. For example, increases in pressure may cause the hydraulic cylinder 126 to move nose 142 of swage tool 140 into contact with collar 150, which is held in position by fingers 144. Collar 150 is held in place at surface 162 (e.g., an Inner Mold Line (IML)) of part 160 over lockbolt 170, which has been driven through hole 164 at parts 160. As a part of this process, a centerline 152 of collar 150 and a centerline 172 of lockbolt 170 are made collinear. During a swaging operation, nose 142 acts as an anvil that swages the collar 150 onto lockbolt 170. The swaging of collar 150 onto the lockbolt 170 fastens parts 160 together, and snaps the pintail 174 (i.e., a frangible portion of lockbolt 170) off of lockbolt 170. When the pintail 174 snaps, nose 142 slightly rebounds in direction R.

During the swaging process, position sensor 146 acquires measurements indicating a distance D between nose 142 and surface 162, and pressure sensor 130 measures pressure at hydraulic cylinder 126. Based on these measurements acquired during swaging, controller 110 characterizes each fastener installation. For example, controller 110 may evaluate one or more position measurements over time to determine whether the fastener has been installed as desired. In this embodiment, controller 110 controls the operations of marker 182 (e.g., an applicator of ink, stickers, or other visually distinguishing marks). Marker 182 is used to indicate locations of fasteners that have not been installed in a desired manner, such as fasteners that are installed out-of-tolerance. Controller 110 may also track identifiers or locations of such fasteners, for later reporting.

Illustrative details of the operation of fastener installation system 100 will be discussed with regard to FIG. 2. Assume, for this embodiment, that fastener installation system has placed a collar 150 onto a surface 162 of a part 160, and awaits applied pressure that will cause the nose 142 to swage the collar 150 onto a lockbolt 170.

Figure 2:
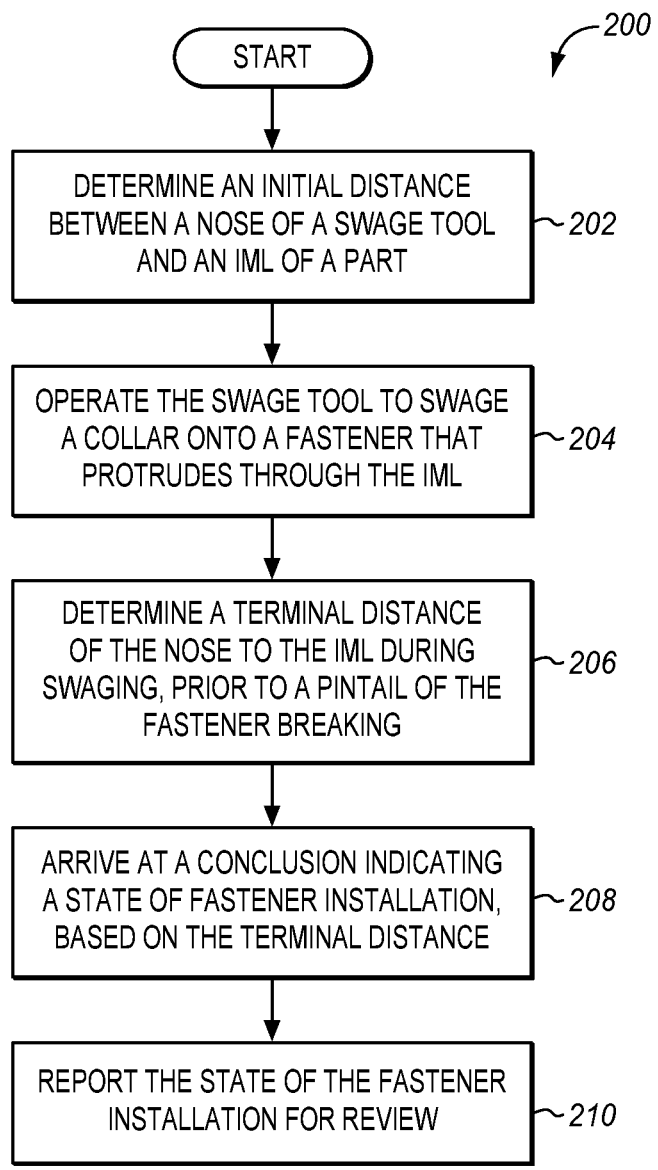
FIG. 2 is a flowchart illustrating a method of monitoring installation of a fastener in accordance with an illustrative embodiment.

FIG. 2 is a flowchart illustrating a method 200 for monitoring installation of a fastener in an illustrative embodiment. The steps of method 200 are described with reference to fastener installation system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 110 determines an initial distance between nose 142 of the swage tool 140 and an IML (e.g., surface 162) of part 160. The initial distance is determined prior to initiating swaging operations. For example, the initial distance may be determined at the time that pressure foot 180 contacts the surface 162, based on a known separation between a tip of pressure foot 180 and a tip of nose 142. In a further example, the initial distance may be measured via a distancing sensor such as a laser or ultrasonic distancing sensor. In one embodiment, distance measurements for the nose 142 are determined based on a clamping position, minus a panel datum indicating a location of the surface 162, plus a known position of the swage tool based on the clamping position, plus a constant.

In step 204, controller operates the swage tool 140 to swage the collar 150 onto a fastener (e.g., lockbolt 170) that protrudes through the IML. During this operation, changes in position of nose 142 are constantly sampled at a known rate (e.g., every five milliseconds, every twenty milliseconds, etc.) based on input from hydraulic cylinder 126, or a distancing sensor (e.g., an embodiment of position sensor 146) disposed at the swage tool 140. Measurements of the position of nose 142 may indicate a distance to surface 162 of a part 160, may indicate a distance traveled by nose 142 during swaging, or other parameters that may be used to infer an amount of distance that nose 142 has proceeded onto collar 150 during swaging. Controller 110 stores these position measurements in an internal memory. As hydraulic motor 122 runs, pressure is increased within hydraulic system 120, which extends hydraulic cylinder 126 further outward. Controller 110 also acquires measurements from pressure sensor 130 as desired, for example at a sampling rate corresponding with the rate at which position is measured.

In step 206, controller 110 determines a terminal distance of the nose 142 to the IML during swaging, prior to a pintail 174 of the fastener snapping off of the fastener. The terminal distance is the shortest distance between the nose 142 and the IML during the swaging operation. The terminal distance may be determined after-the-fact (i.e., after the pintail has already snapped), based on a retrospective analysis of pressure and position measurements that were acquired during swaging. Controller 110 may analyze hydraulic pressure readings to identify a point in time that the pintail of the fastener broke, and determine a distance D between the nose and the IML at the point in time.

Pressure measurements form a detectable peak-and-valley pattern when a pintail snaps. According to this pattern, pull pressure (i.e., pressure applied to hydraulic line 124 during swaging while nose 142 proceeds towards surface 162) (which has been increasing), rapidly reduces and then rapidly increases over the peak, due to the nose 142 rebounding in direction R of FIG. 1 as the pintail snaps. For example, controller 110 may detect a point in time at which pressure has dropped at a rate of more than one hundred PSI per second within a period of fifty milliseconds, controller 110 interprets this point in time as indicating the snap of a pintail. Controller 110 may then identify a peak preceding the drop in pressure, and may determine the terminal distance based on the position of the nose at a first point in time when the peak was reached. In a further example, controller 110 may proceed backward from the first point in time until reaching a second point in time at which a threshold value of pressure is reached. The threshold value for pressure may be a predetermined value indicating a minimum pressure at which a pintail could snap, or may be five to ten percent less than that minimum pressure or five to ten percent less than the detected peak in pressure. Controller 110 may then determine the distance between the nose 142 and the IML at the second point in time. Thus, during operation the controller 110 utilizes pressure readings to determine a point in time at which to measure the terminal distance.

In step 208, controller 110 arrives at a conclusion indicating a state of fastener installation for the fastener being installed, based on the terminal distance that was measured at a point in time indicated by pressure measurements. For example, if the terminal distance is less than a threshold amount, controller 110 concludes that the fastener installation has completed successfully. If the terminal distance is not less than the threshold amount, controller 110 concludes that the fastener installation has not completed successfully. The threshold amount of distance may be, for example, zero millimeters, less than two millimeters, or any suitable predefined distance which indicates that nose 142 has fully swaged the collar 150 into place in an in-tolerance manner.

In step 210, controller 110 reports the state of the fastener installation for review. This may comprise controller 110 providing the state of the fastener installation in a digital report via a display (e.g., a screen) for review by a technician, generating and transmitting or printing a document that indicates the state of the fastener installation, etc. In one embodiment, a large number of fasteners are installed within each of multiple sections of an aircraft being assembled, and controller 110 provides a report for each section indicating states of fastener installation for each fastener in that section. In a further embodiment, controller 110 reports the state of fastener installation by activating marker 182 at nose 142, which applies a marking fluid (e.g., a bright ink) directly onto collar 150 and/or the fastener to indicate the presence of an unsuccessful fastener installation. This facilitates the speed at which the fastener may be located for manual review and distinguished from other fasteners installed in the same region. In further embodiments, controller 110 alerts a technician immediately when an out of tolerance condition is detected, via an on-screen visual image and/or an audio indication. Steps 206-208 and/or 210 may be performed in real-time for each fastener, prior to installing a next fastener.

Method 200 provides a technical benefit over prior techniques because it enables the detection of conditions that previously had to be manually inspected for using a manually placed gauge (e.g., a "go-no-go" gauge), and because method 200 performs this detection without the need for specialized or expensive visual sensing equipment (e.g., cameras).

FIGS. 3-12 illustrate an animation of an inner mold line machine of a fastener installation system that tracks nose position via a pressure sensor in accordance with an illustrative embodiment. Specifically, FIG. 3 illustrates a swage tool 300 poised above a part 350 (e.g., a splice between skin panels 354) into which a fastener will be installed. Fingers of the swage tool 300 are not shown in order to enhance clarity, but retain the collar 330 in place at nose 310. As shown in FIG. 3, a feed arm 340 has supplied a collar 330 to a nose 310 of the swage tool. A pressure foot 320 is disposed next to the nose 310, and is actuatable to be placed onto IML 352 of part 350. Nose 310 has a tip 312, and pressure foot 320 has a tip 322.

Figure 5:
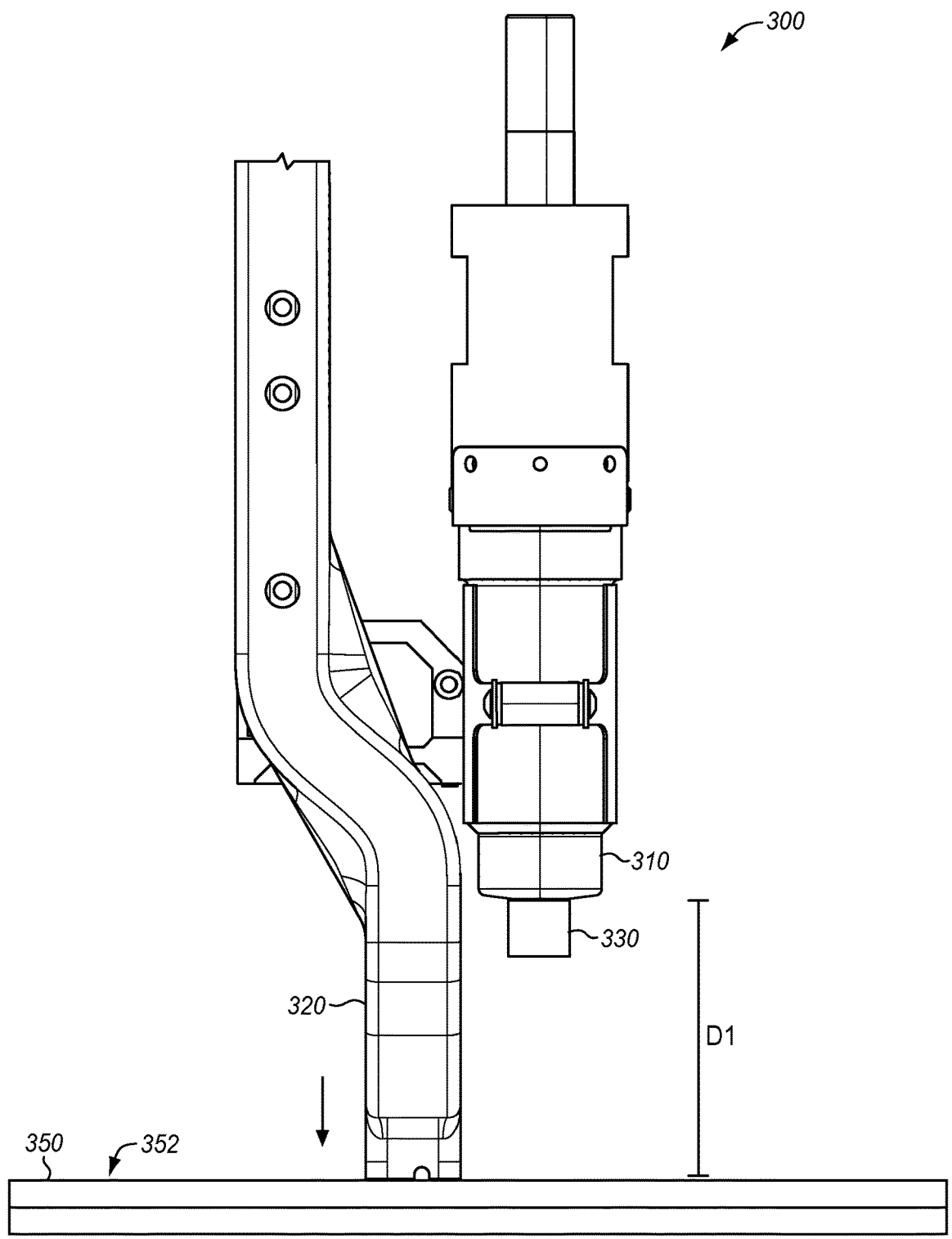
Figure 6:
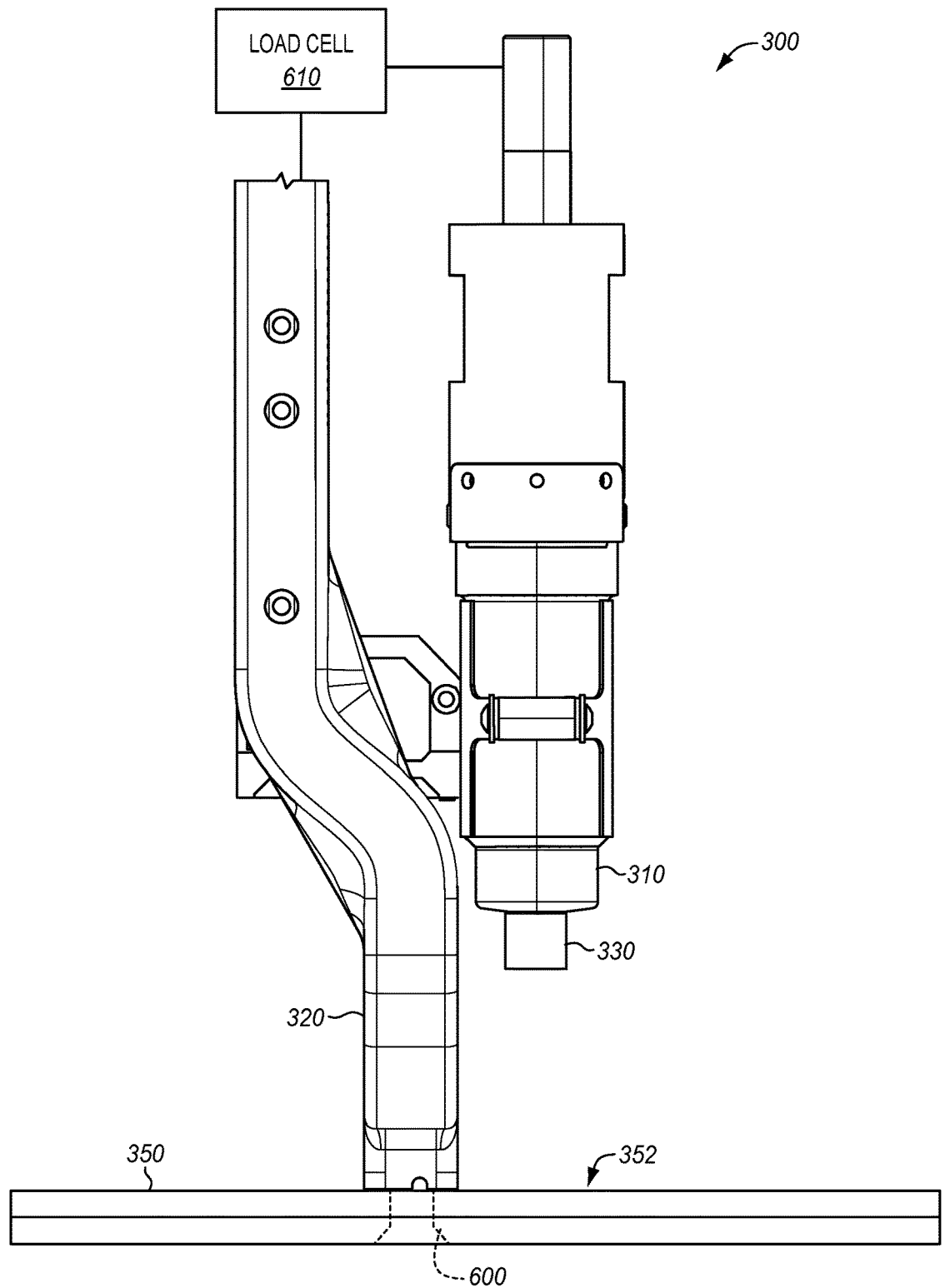
Figure 9:
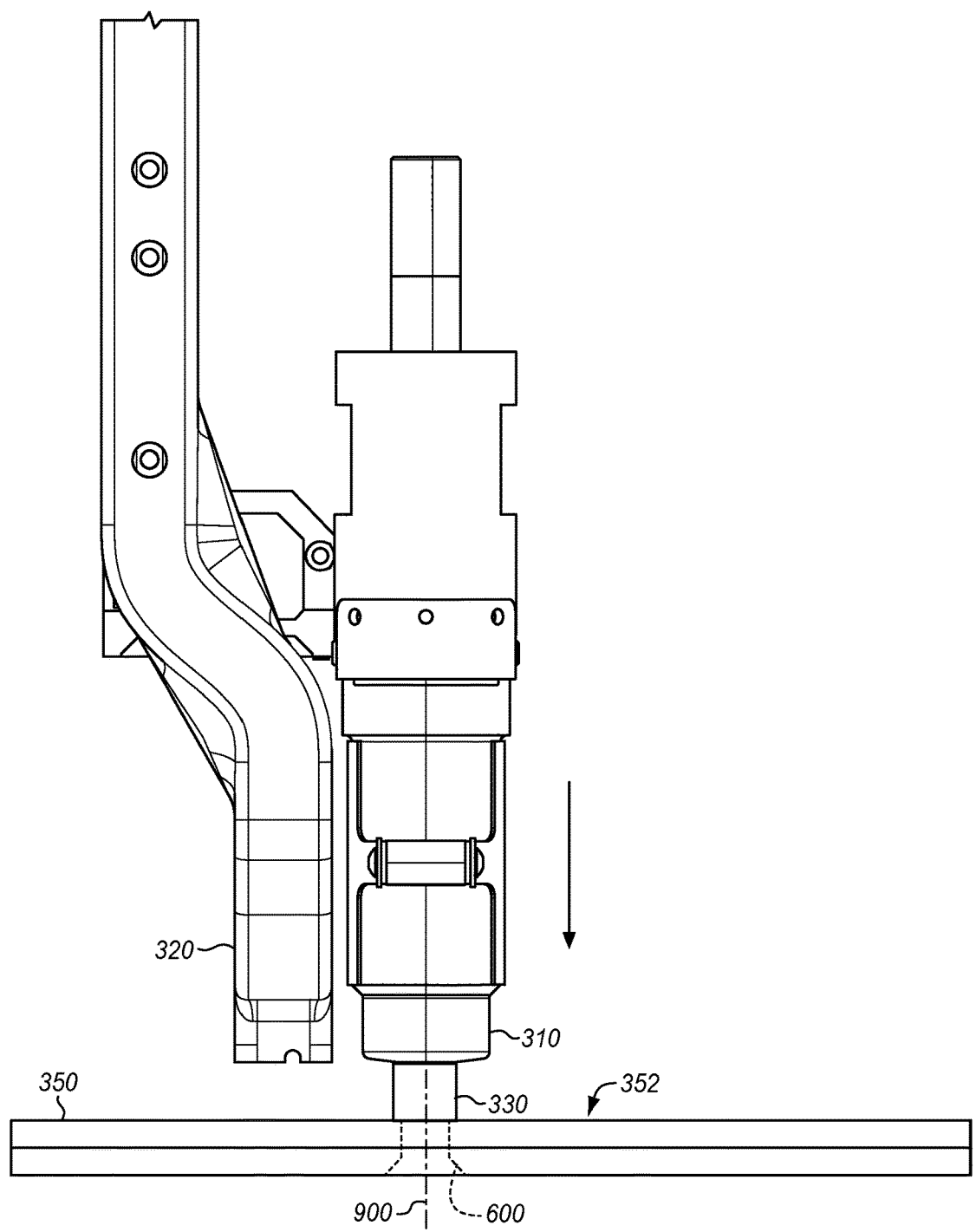

In FIG. 4, feed arm 340 has been retracted, which prepares the nose 310 for swaging to be performed, by removing a component that would otherwise cause physical interference. In FIG. 5, pressure foot 320 is driven downward until tip 322 is placed into contact with part 350. This operation in FIG. 5 is performed in order to determine a distance (D1) between nose 310 and part 350. Pressure foot 320 applies a vacuum that holds it in place at IML 352. Contact between pressure foot 320 and IML 352 triggers a load cell 610 at swage tool 300. After the load cell 610 is triggered, a position of the pressure foot 320 is determined based on a current amount of extension of the pressure foot 320 from a retracted position as depicted in FIG. 4 (e.g., as indicated by an actuator for pressure foot 320). Based on this position of tip 322 of pressure foot 320 and a known separation between tip 322 and tip 312, an initial distance (D1) between tip 312 of nose 310 and IML 352 is determined in FIG. 5. In FIG. 6, an Outer Mold Line (OML) machine (not shown) drills out a hole 600 at part 350 while the vacuum is applied. Detritus resulting from drilling is removed via the vacuum applied by pressure foot 320. In FIG. 7, pressure foot 320 is retracted, and in FIG. 8, swage tool 300 is laterally repositioned to align the nose 310 with hole 600. In FIG. 9, nose 310 is driven downwards until collar 330 is placed into contact with IML 352, while collar 330 remains axially aligned with hole 600, such that both are centered at axis 900.

Figure 10:
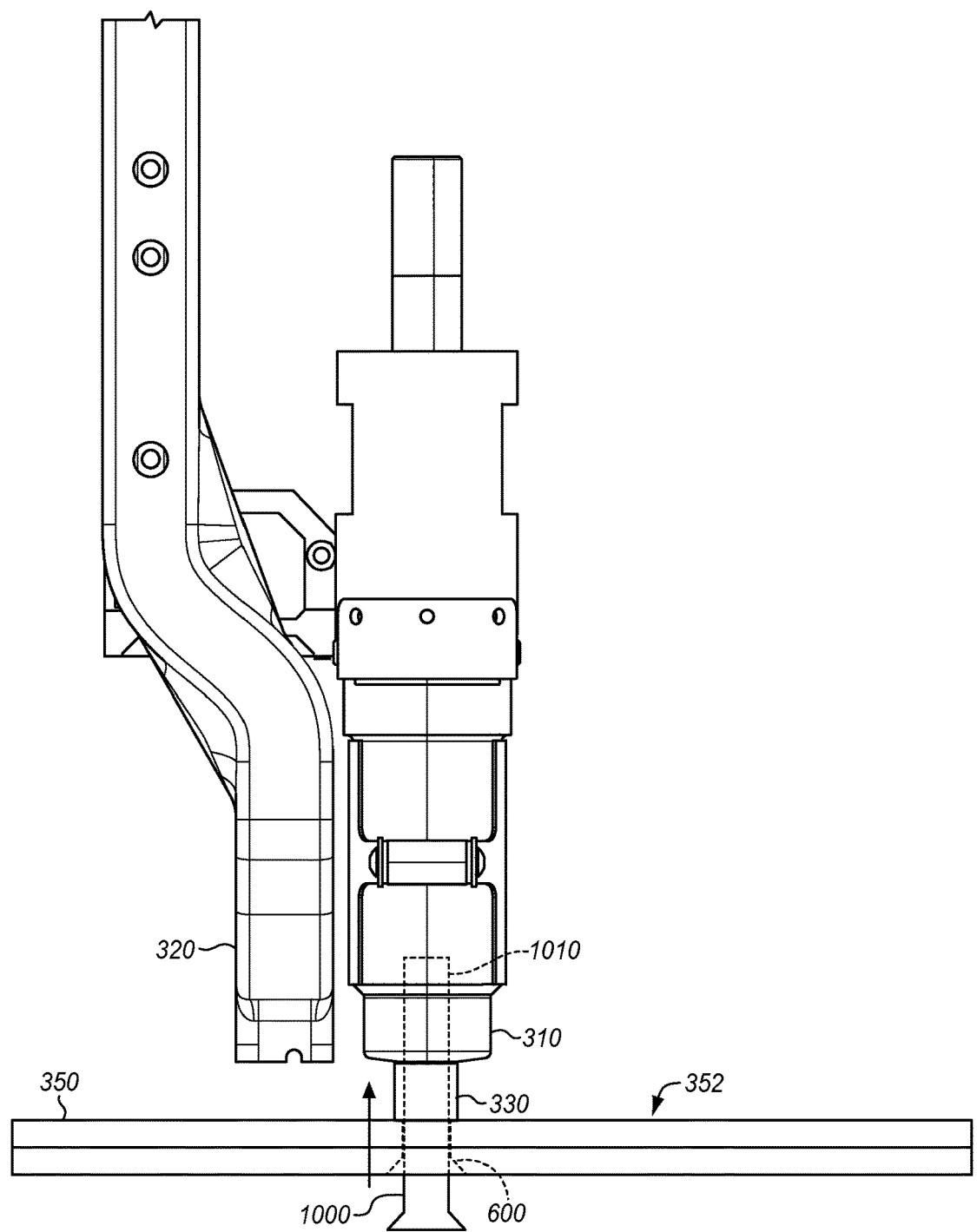
Figure 11:
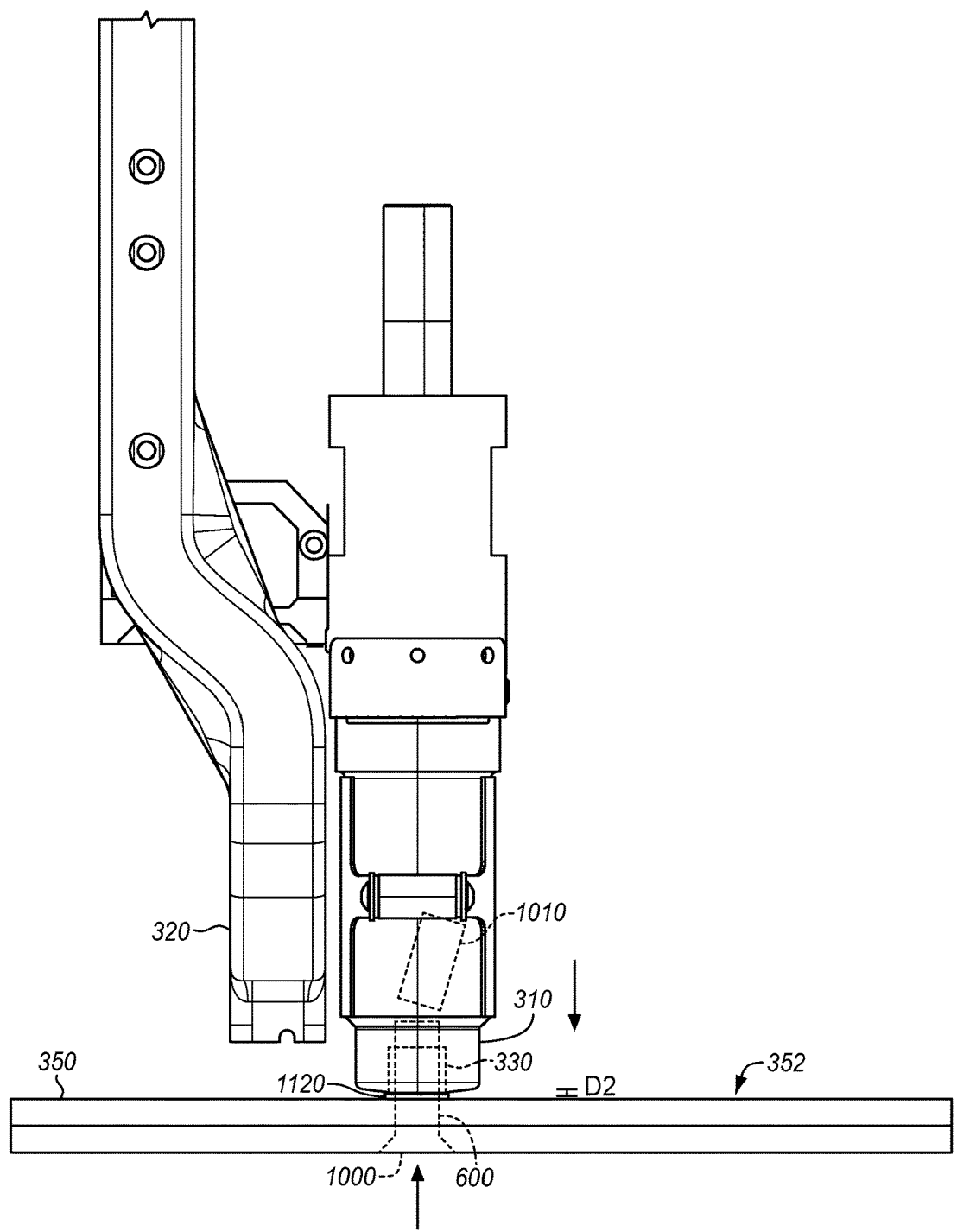

In FIG. 10, a fastener 1000 is driven through hole 600 and collar 330, such that a pintail 1010 of the fastener has entered nose 310. A hydraulic motor is then activated, and nose 310 proceeds over collar 330 to swage the collar 330 into place on fastener 1000 as shown in FIG. 11. This results in lip 1120 at collar 330, and also causes pintail 1010 to snap off of fastener 1000. A controller of the swage tool 300 determines a position of nose 310 at or before the moment that pintail 1010 snapped (e.g., as indicated by an actuator for nose 310). Based on this position, a terminal distance (D2) of nose 310 to IML 352 is determined. If the terminal distance is less than a threshold, then the fastener has been installed as desired. In FIG. 12, swage tool 300 is retracted, leaving the fastener 1000 in place.

Figure 13:
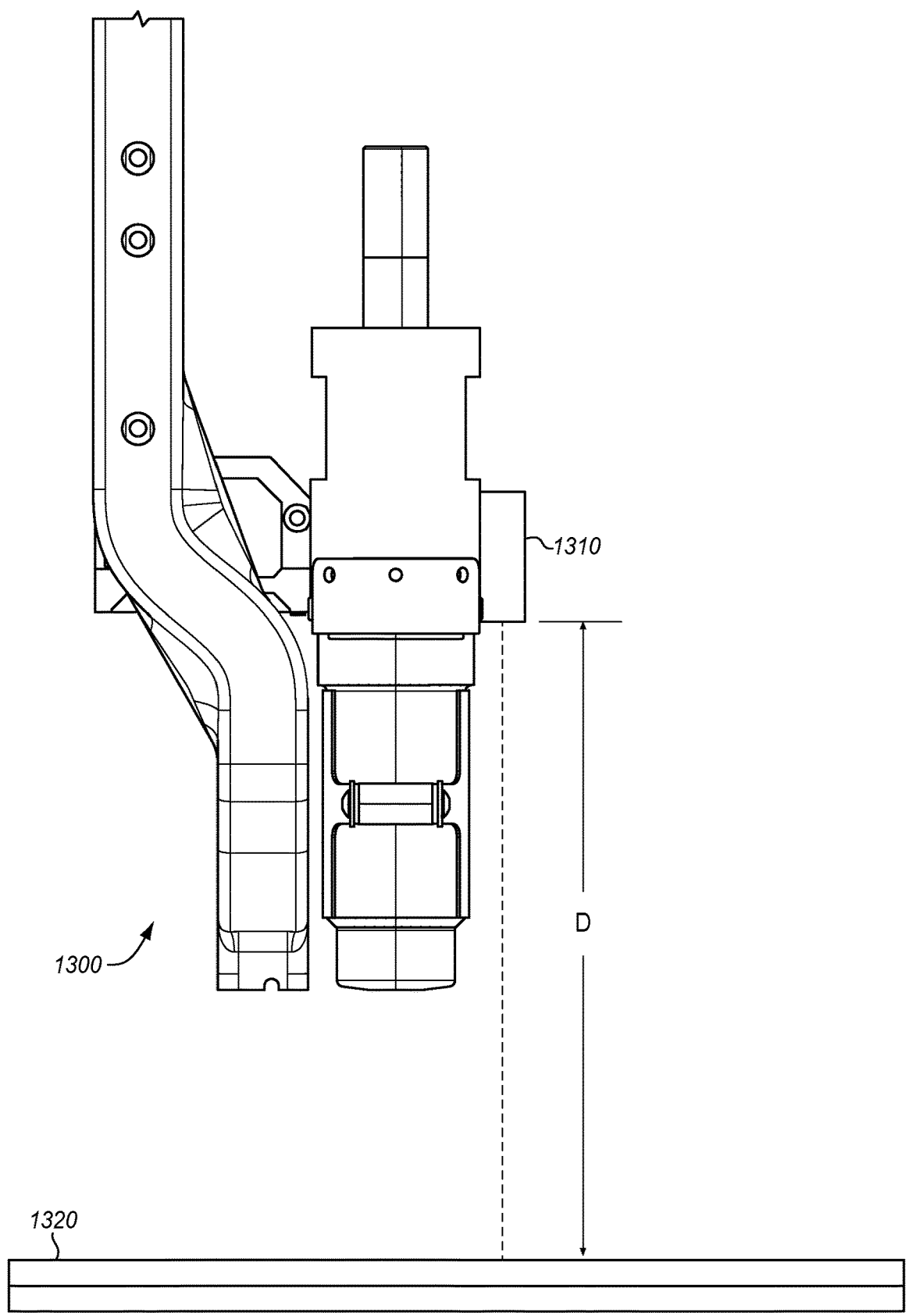
FIG. 13 illustrates an inner mold line machine of a fastener installation system that includes a distancing sensor an illustrative embodiment.
Figure 14:
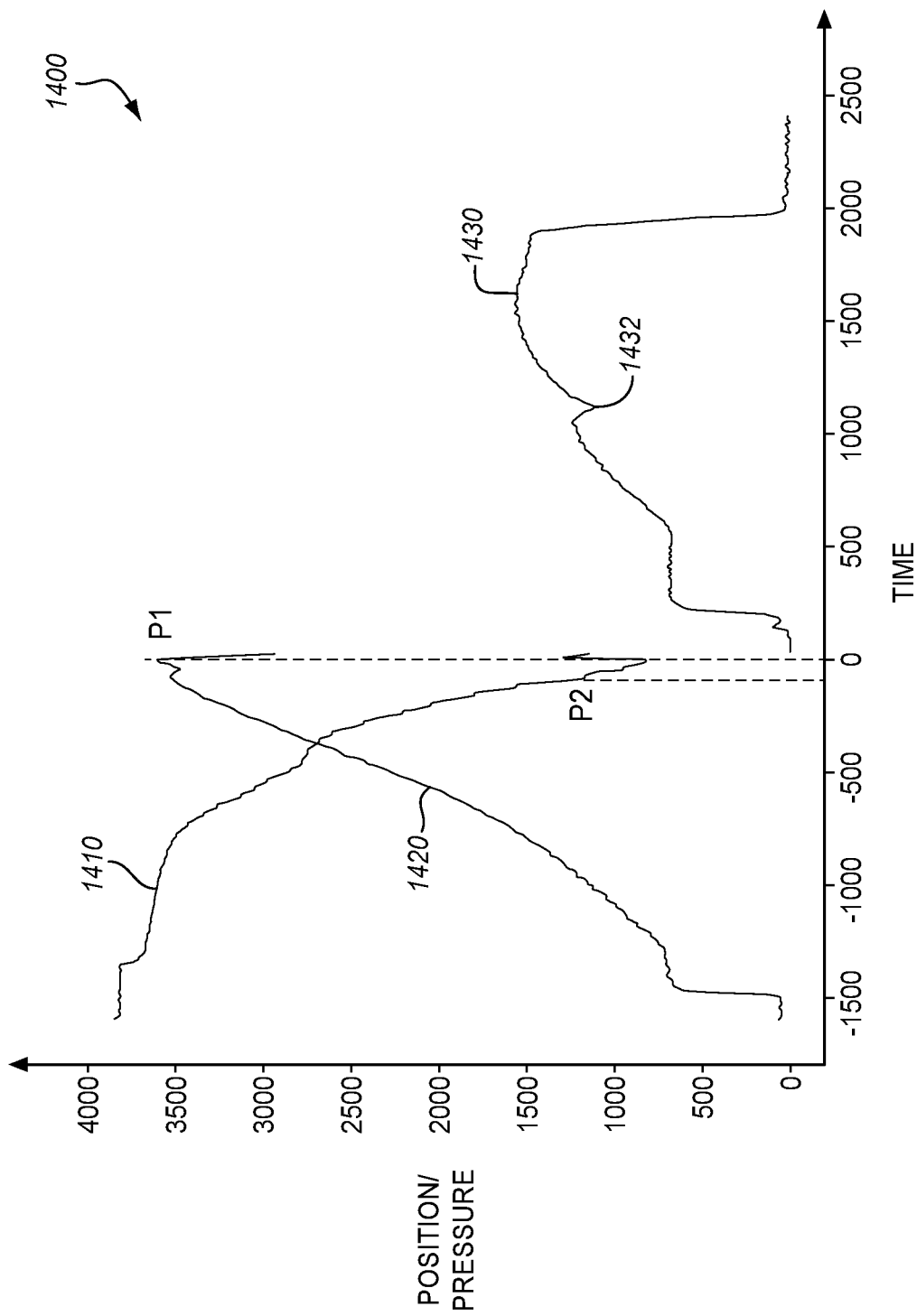
FIG. 14 is a chart illustrating relationships between pressure, position, and time during fastener installation in an illustrative embodiment.

With a discussion provided above of an exemplary technique for fastener installation, FIG. 13 illustrates a further potential embodiment of a swage tool that includes an active distancing sensor such as a laser or LIDAR sensor, and FIG. 14 illustrates pressure and position measurements that may be utilized to determine whether a fastener installation has been performed successfully.

FIG. 13 illustrates an inner mold line machine of a fastener installation system that includes a distancing sensor 1310 an illustrative embodiment. In this embodiment, a swage tool 1300 includes the distancing sensor 1310 in the form of an infrared, ultrasound, or laser distancing sensor that measures distance (D) to a splice 1320. By comparing distances measured by the distancing sensor 1310 initially before swaging begins, and immediately before a pintail of a fastener has snapped, a controller of swage tool 1300 may determine whether swaging has been completed successfully for a fastener. The difference between the initial distance (e.g., D1 as discussed in the prior FIGS.) and terminal distance (e.g., D2 as discussed in the prior FIGS.)

may be compared, and if the difference is less than a desired amount indicated in design parameters, the swaging operation may be flagged as being out-of-tolerance. In further embodiments, the swage tool 1300 is coupled with a sensor in the form of a load cell that detects distance by reporting when a nose of the swaging tool 1300 has contacted an IML of the part (i.e., by reporting that the distance between the nose and the IML is zero).

FIG. 14 is a chart illustrating relationships between pressure, position, and time during fastener installation in an illustrative embodiment. FIG. 14 illustrates measured positions 1410, pull pressures 1420, and return pressures 1430 for a swage tool over time. A controller of the swage tool is able to retrospectively determine whether swaging was performed in a desired manner, by reviewing pull pressure 1420 for a first point in time (P1) where pressure dropped precipitously before rising again (i.e., due to physical rebounding after a pintail has broken). The controller may then determine a position of a nose of the swage tool at the first point in time, or at a second point in time (P2) prior to the first point when the pressure was less than a predefined threshold (e.g., five to ten percent less than a minimum break pressure known for pintails).

In one embodiment, swage nose position is calculated by the following formula:

$$\text{SwageNosePosition} = \text{ClampAxisPosition} - \text{PanelDatum} + \text{SwageToolPosition} + \text{SystemOffsetConstant} \quad (1)$$

According to this formula, PanelDatum is measured as an initial distance discussed above, clamp axis is the direction shown by the arrow on FIG. 5, the SystemOffsetConstant is calculated by comparing controller measurements to direct inspection measurements for a set of holes, and SystemOffsetConstant is chosen such that it minimizes the difference between the T distance values and measured T values for the swaged collar (T is the swage nose position at the time of pintail pop or preceding the pop based on a pressure threshold). Thus, SystemOffsetConstant is a calibration factor. In one embodiment, the nose position data is filtered out during and/or after at pintail breaks. Note that this equation assumes all axes are oriented in the same direction for simplicity.

EXAMPLES

In the following examples, additional processes, systems, and methods are described in the context of a fastener installation system.

Figure 15:
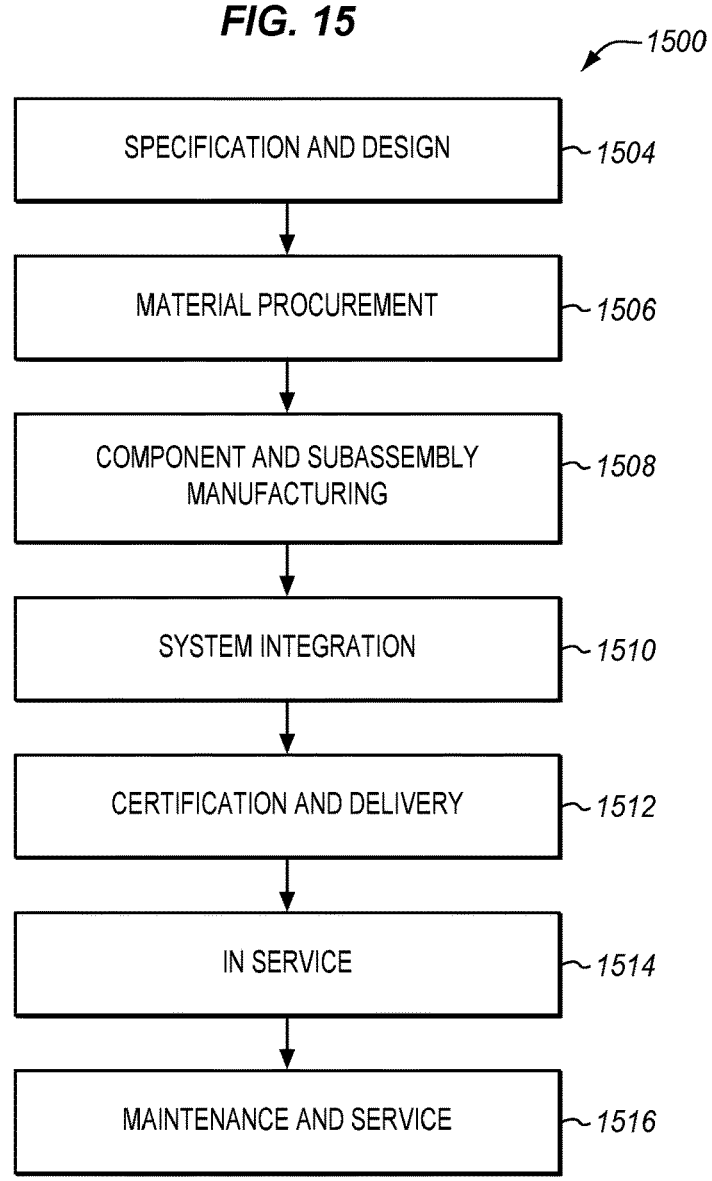
FIG. 15 is a flow diagram of aircraft production and service methodology in an illustrative embodiment.
Figure 16:
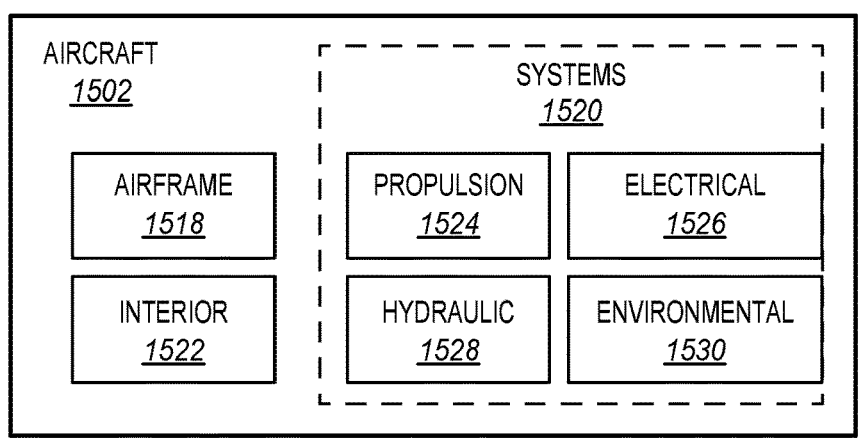
FIG. 16 is a block diagram of an aircraft in an illustrative embodiment.

Referring more particularly to the drawings, embodiments of the disclosure may be described in the context of aircraft manufacturing and service in method 1500 as shown in FIG. 15 and an aircraft 1502 as shown in FIG. 16. During pre-production, method 1500 may include specification and design 1504 of the aircraft 1502 and material procurement 1506. During production, component and subassembly manufacturing 1508 and system integration 1510 of the aircraft 1502 takes place. Thereafter, the aircraft 1502 may go through certification and delivery 1512 in order to be placed in service 1514. While in service by a customer, the aircraft 1502 is scheduled for routine work in maintenance and service 1516 (which may also include modification, reconfiguration, refurbishment, and so on). Apparatus and methods embodied herein may be employed during any one or more suitable stages of the production and service described in method 1500 (e.g., specification and design 1504, material procurement 1506, component and subassembly manufacturing 1508, system integration 1510, certification and delivery 1512, service 1514, maintenance and service 1516) and/or any suitable component of aircraft 1502 (e.g., airframe 1518, systems 1520, interior 1522, propulsion system 1524, electrical system 1526, hydraulic system 1528, environmental 1530).

Each of the processes of method 1500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 1502 produced by method 1500 may include an airframe 1518 with a plurality of systems 1520 and an interior 1522. Examples of systems 1520 include one or more of a propulsion system 1524, an electrical system 1526, a hydraulic system 1528, and an environmental system 1530. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1500. For example, components or subassemblies corresponding to component and subassembly manufacturing 1508 may be fabricated or manufactured in a manner similar to components or subassemblies produced while the aircraft 1502 is in service. Also, one or more apparatus embodiments, method embodiments, or a combination thereof may be utilized during the subassembly manufacturing 1508 and system integration 1510, for example, by substantially expediting assembly of or reducing the cost of an aircraft 1502. Similarly, one or more of apparatus embodiments, method embodiments, or a combination thereof may be utilized while the aircraft 1502 is in service, for example and without limitation during the maintenance and service 1516. For example, the techniques and systems described herein may be used for material procurement 1506, component and subassembly manufacturing 1508, system integration 1510, service 1514, and/or maintenance and service 1516, and/or may be used for airframe 1518 and/or interior 1522. These techniques and systems may even be utilized for systems 1520, including, for example, propulsion system 1524, electrical system 1526, hydraulic 1528, and/or environmental system 1530.

In one embodiment, a part comprises a portion of airframe 1518, and is manufactured during component and subassembly manufacturing 1508. The part may then be assembled into an aircraft in system integration 1510, and then be utilized in service 1514 until wear renders the part unusable. Then, in maintenance and service 1516, the part may be discarded and replaced with a newly manufactured part. Inventive components and methods may be utilized throughout component and subassembly manufacturing 1508 in order to install fasteners during the manufacture of new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for inspecting installation of a fastener, the method comprising:
    determining an initial distance between a nose of a swage tool and an Inner Mold Line (IML) of a part;
    operating the swage tool to swage a collar onto a fastener that protrudes through the IML of the part;
    determining a terminal distance of the nose to the IML during swaging, prior to a pintail of the fastener breaking; and
    arriving at a conclusion indicating a state of a fastener installation, based on the terminal distance.

2. The method of claim 1 wherein:
    determining the initial distance comprises:
        placing a tip of a pressure foot of the swage tool in contact with the IML;
        determining a separation between the tip of the pressure foot and a tip of the nose; and
        determining the initial distance based on the separation between the tip of the pressure foot and a tip of the nose.

3. The method of claim 1 wherein:
    determining the terminal distance comprises:
        analyzing hydraulic pressure readings to identify a point in time that the pintail of the fastener broke; and
        determining a distance between the nose and the IML at the point in time.

4. The method of claim 1 wherein:
    determining the terminal distance comprises:
        analyzing hydraulic pressure readings to identify a first point in time that the pintail of the fastener broke;
        identifying a second point in time prior to the first point in time when hydraulic pressure reached a threshold value; and
        determining a distance between the nose and the IML at the second point in time.

5. The method of claim 1 further comprising:
    determining the terminal distance and arriving at the conclusion is performed in real-time prior to installing a next fastener.

6. The method of claim 1 wherein:
    arriving at the conclusion indicating the state of the fastener installation comprises:
        if the terminal distance is less than a threshold amount, concluding that the fastener installation has completed successfully; and
        if the terminal distance is not less than a threshold amount, concluding that the fastener installation has not completed successfully.

7. The method of claim 1 wherein:
    reporting the state of the fastener installation comprises:
        including the state of the fastener installation within a report detailing states of fastener installation for multiple fasteners within a region of the part; and
        providing the report via a display for review by a technician.

8. The method of claim 1 further comprising:
    reporting the state of the fastener installation for review.

9. A portion of an aircraft assembled according to the method of claim 1.

10. A non-transitory computer readable medium embodying programmed instructions which, when executed by a processor, are operable for performing a method for inspecting installation of a fastener, the method comprising:
    determining an initial distance between a nose of a swage tool and an Inner Mold Line (IML) of a part;
    operating the swage tool to swage a collar onto a fastener that protrudes through the IML of the part;
    determining a terminal distance of the nose to the IML during swaging, prior to a pintail of the fastener breaking; and
    arriving at a conclusion indicating a state of a fastener installation, based on the terminal distance.

11. The medium of claim 10 wherein:
    determining the initial distance comprises:
        placing a tip of a pressure foot of the swage tool in contact with the IML;
        determining a separation between the tip of the pressure foot and a tip of the nose; and
        determining the initial distance based on the separation between the tip of the pressure foot and a tip of the nose.

12. The medium of claim 10 wherein:
    determining the terminal distance comprises:
        analyzing hydraulic pressure readings to identify a point in time that the pintail of the fastener broke; and
        determining a distance between the nose and the IML at the point in time.

13. The medium of claim 10 wherein:
    determining the terminal distance comprises:
        analyzing hydraulic pressure readings to identify a first point in time that the pintail of the fastener broke;
        identifying a second point in time prior to the first point in time when hydraulic pressure reached a threshold value; and
        determining a distance between the nose and the IML at the second point in time.

14. The medium of claim 10 wherein the method further comprises:
    determining the terminal distance and arriving at the conclusion is performed in real-time prior to installing a next fastener.

15. The medium of claim 10 wherein:
    arriving at the conclusion indicating the state of the fastener installation comprises:

if the terminal distance is less than a threshold amount, concluding that the fastener installation has completed successfully; and if the terminal distance is not less than a threshold amount, concluding that the fastener installation has not completed successfully.

16. The medium of claim 10 wherein:

reporting the state of the fastener installation comprises:
including the state of the fastener installation within a report detailing states of fastener installation for multiple fasteners within a region of the part; and
providing the report via a display for review by a technician.

17. The medium of claim 10 wherein the method further comprises:

reporting the state of the fastener installation for review.

18. A portion of an aircraft assembled according to the method defined by the instructions stored on the computer readable medium of claim 10.

19. The method of claim 1 wherein:

operating the swage tool comprises making a centerline of the collar and a centerline of the fastener collinear.

20. The medium of claim 10 wherein:

operating the swage tool comprises making a centerline of the collar and a centerline of the fastener collinear.

* * * * *